United States Patent
Ohmori et al.

(10) Patent No.: US 9,520,597 B2
(45) Date of Patent: Dec. 13, 2016

(54) CATHODE MATERIAL, INTERCONNECTOR MATERIAL AND SOLID OXIDE FUEL CELL

(75) Inventors: Makoto Ohmori, Nagoya (JP); Ayano Kobayashi, Nagoya (JP); Shinji Fujisaki, Kuwana (JP)

(73) Assignee: NGK INSULATORS, LTD., Nagoya (JP)

( * ) Notice: Subject to any disclaimer, the term of this patent is extended or adjusted under 35 U.S.C. 154(b) by 123 days.

(21) Appl. No.: 13/616,905

(22) Filed: Sep. 14, 2012

(65) Prior Publication Data

US 2013/0244132 A1    Sep. 19, 2013

(30) Foreign Application Priority Data

Dec. 19, 2011  (JP) .................................. 2011-277507
Feb. 17, 2012  (JP) .................................... 2012-33102

(51) Int. Cl.
*H01M 8/10* (2016.01)
*H01M 4/86* (2006.01)
(Continued)

(52) U.S. Cl.
CPC ........... *H01M 4/8663* (2013.01); *B01J 23/002* (2013.01); *B01J 23/83* (2013.01);
(Continued)

(58) Field of Classification Search
CPC  H01M 4/8663; H01M 4/9033; H01M 8/0202; H01M 8/0217; H01M 2008/1293; Y02E 60/525; Y02E 60/50; C04B 2235/727; C04B 2235/768; C04B 2235/725; C04B 2235/72; C04B 2235/5445; C04B 2235/5436; C04B 2235/3279; C04B 2235/3275; C04B 2235/3227; C04B 2235/3213; C04B 35/26; C04B 35/01; B01J 23/002; B01J 23/83; B01J 27/188; B01J 35/0033; B01J 2523/00; B01J 2523/24; B01J 2523/3706; B01J 2523/842; B01J 2523/845; B01J 2523/305; B01J 2523/51; B01J 2523/67
(Continued)

(56) References Cited

U.S. PATENT DOCUMENTS

2002/0086189 A1 *  7/2002  Pham ...................... C23C 24/08
                                                                  428/698
2004/0018298 A1 *  1/2004  Pham et al. .................. 427/115
(Continued)

FOREIGN PATENT DOCUMENTS

EP     2410598 A1   1/2012
JP    09-092302 A   4/1997
(Continued)

OTHER PUBLICATIONS

Office Action of the corresponding Japanese Patent No. 2012-033102, dated May 15, 2012.
(Continued)

*Primary Examiner* — Jonathan Jelsma
*Assistant Examiner* — Omar Kekia
(74) *Attorney, Agent, or Firm* — Global IP Counselors, LLP

(57) ABSTRACT

A cathode material for a solid oxide fuel cell comprises a complex oxide having a perovskite structure expressed by the general formula ABO3, a content amount of P included in the complex oxide being at least 1 ppm and no more than 50 ppm, a content amount of Cr in the complex oxide being at least 1 ppm and no more than 500 ppm, and a content amount of B in the complex oxide being at least 1 ppm and no more than 50 ppm in a weight ratio relative to a total weight of the complex oxide.

16 Claims, 7 Drawing Sheets
(2 of 7 Drawing Sheet(s) Filed in Color)

(51) Int. Cl.
*H01M 4/90* (2006.01)
*B01J 23/00* (2006.01)
*B01J 23/83* (2006.01)
*B01J 35/00* (2006.01)
*C04B 35/01* (2006.01)
*C04B 35/26* (2006.01)
*H01M 8/02* (2016.01)
*H01M 8/12* (2016.01)
*B01J 27/188* (2006.01)

(52) U.S. Cl.
CPC .......... *B01J 35/0033* (2013.01); *C04B 35/01* (2013.01); *C04B 35/26* (2013.01); *H01M 4/9033* (2013.01); *H01M 8/0217* (2013.01); *B01J 27/188* (2013.01); *B01J 2523/00* (2013.01); *C04B 2235/3213* (2013.01); *C04B 2235/3227* (2013.01); *C04B 2235/3275* (2013.01); *C04B 2235/3279* (2013.01); *C04B 2235/5436* (2013.01); *C04B 2235/5445* (2013.01); *C04B 2235/72* (2013.01); *C04B 2235/725* (2013.01); *C04B 2235/727* (2013.01); *C04B 2235/768* (2013.01); *H01M 8/0202* (2013.01); *H01M 2008/1293* (2013.01); *Y02E 60/50* (2013.01); *Y02E 60/525* (2013.01)

(58) Field of Classification Search
USPC ........ 429/488, 489, 491, 482, 528; 423/263, 423/593.1, 594.1
See application file for complete search history.

(56) References Cited

U.S. PATENT DOCUMENTS

| | | | |
|---|---|---|---|
| 2008/0124598 A1* | 5/2008 | Backhaus-Ricoult et al. | 429/27 |
| 2009/0280376 A1 | 11/2009 | Chiba et al. | |
| 2011/0198216 A1* | 8/2011 | Larsen et al. | 204/242 |

FOREIGN PATENT DOCUMENTS

| | | | |
|---|---|---|---|
| JP | 2000-251533 A | 9/2000 |
| JP | 2001-297783 A | 10/2001 |
| JP | 2003-308846 A | 10/2003 |
| JP | 2004-265746 A | 9/2004 |
| JP | 2004-273143 A | 9/2004 |
| JP | 2006-032132 A | 2/2006 |
| JP | 2009-048917 A | 3/2009 |
| JP | 2011-190148 A | 9/2011 |
| JP | 2012-043774 A | 3/2012 |
| JP | 2012-138256 A | 7/2012 |
| JP | 5140787 B1 | 2/2013 |
| WO | WO-2007/061043 A1 | 5/2007 |

OTHER PUBLICATIONS

Office Action of the corresponding Japanese Patent No. 2012-033102, dated Jul. 3, 2012.
International Search Report of corresponding International Application No. PCT/JP2012/073682, dated on Nov. 6, 2012.
The Extended European Search Report for the corresponding European patent application No. 12860994.8 issued on Nov. 11, 2015.
Bucher et al., "Transport properties of La0.4Sr0.6CoO3-delta," Solid State Ionics, May 1, 2001, pp. 375-380, vol. 141-142, North Holland Pub. Company, Amsterdam, NL.
The Extended European Search Report for the corresponding European patent application No. 12859479.3 issued on May 26, 2015.
U.S. Non Final Office Action issued on Apr. 18, 2016 for U.S. Appl. No. 14/304,434.
U.S. Final Office action issued on Oct. 17, 2016 for U.S. Appl. No. 14/304,434.
Simner et al., "Degradation Mechanisms of La—Sr—Co—Fe—O3 SOFC Cathodes", Electrochemical and Solid-State Letters, Aug. 2006, pp. A478-A481, The Electrochemical Society, U.S.

* cited by examiner

CATHODE MATERIAL, INTERCONNECTOR MATERIAL AND SOLID OXIDE FUEL CELL

BACKGROUND

Technical Field

The present invention relates to a cathode material and a solid oxide fuel cell.

Description of the Related Art

In recent years, several materials and structures have been proposed in relation to fuel cell batteries due to the attention focused on fuel cell batteries in light of effective use of energy resources and environmental problems.

JPA-2006-32132 discloses the use of an LSCF powder as a raw material powder for the cathode of a solid oxide fuel cell (SOFC).

SUMMARY

However, the available voltage may be reduced during repeated power generation using the fuel cell. The present inventors gained the new insight that one cause of this reduction in output is deterioration of the cathode.

The technique disclosed herein is based on this new insight and addresses the problem of providing a new cathode material and a solid oxide fuel cell that includes the same.

Diligent research into solving the above problem was conducted and as a result insight was gained that the deterioration of a cathode and an interconnector (generally referred to below for the sake of convenience as an "electrode") can be suppressed by increasing the uniformity of the concentration of the electrode material components.

In that context, a complex oxide having a perovskite structure expressed by the general formula $ABO_3$. A content amount of P included in the complex oxide is at least 1 ppm and no more than 50 ppm in a weight ratio relative to a total weight of the complex oxide. A content amount of Cr in the complex oxide is at least 1 ppm and no more than 500 ppm in the weight ratio relative to a total weight of the complex oxide. A content amount of B in the complex oxide is at least 1 ppm and no more than 50 ppm in the weight ratio relative to a total weight of the complex oxide.

The electrode material described above is suitable as a material for forming the electrode of a fuel cell. The electrode formed by this electrode material exhibits superior durability while suppressing deterioration.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the attached drawings which form a part of this original disclosure.

DETAILED DESCRIPTION OF EMBODIMENTS

Figure 1:
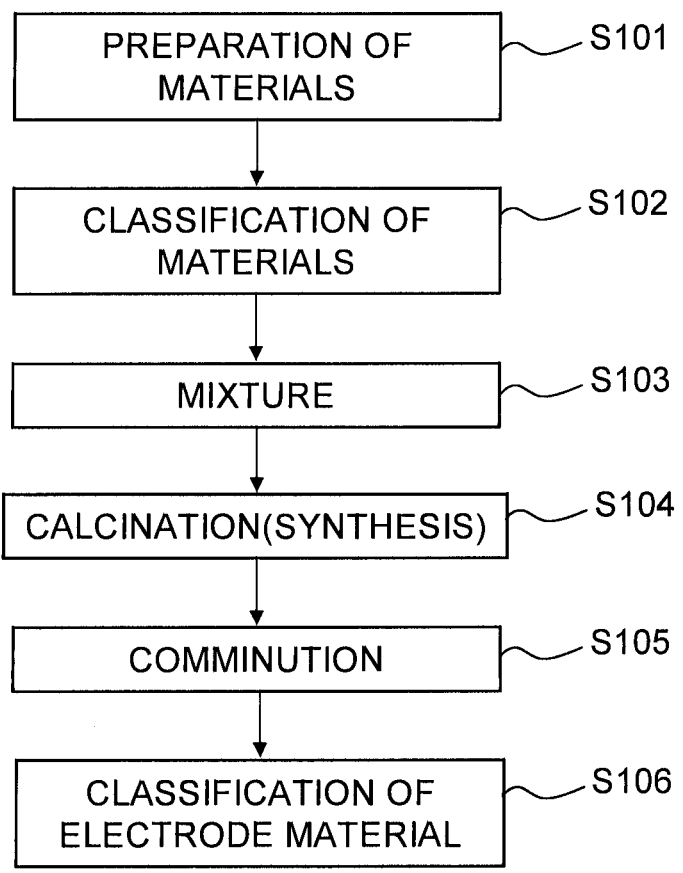
FIG. 1 is a flowchart describing a method of manufacturing an electrode material using a solid-phase method.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1. Electrode Material

The electrode material includes a complex oxide having a perovskite structure. The electrode material may include components other than a complex oxide. As described below, the electrode material according to the present embodiment is suitably used as a material to configure the cathode or the interconnector of the solid oxide fuel cell.

The composition of the complex oxide is expressed by the general formula $ABO_3$. Furthermore, at least one of La and Sr may be contained in the A site. An actual example of this type of complex oxide for use as a cathode material includes LSCF, that is to say, $(La, Sr)(Co, Fe)O_3$, LSF that is to say, $(La, Sr) FeO_3$, LSC that is to say, $(La, Sr)CoO_3$, LNF that is to say, $La(Ni, Fe)O_3$, SSC that is to say, $(Sm, Sr)CoO_3$, and the like. These complex oxides are materials that combine characteristics related to oxygen ion conductivity and electron conductivity, and are termed mixed conducting materials. Furthermore, examples of an interconnector material include LCC, that is to say, materials such as $(La, Ca)CrO_3$, and the like.

The electrode material may include the complex oxide as a "principal component". The feature "include as a principal component" when a composition X contains a material Y means that the material Y comprises preferably at least 60 wt % overall of composition X, more preferably 70 wt %, and still more preferably at least 90 wt % of the overall composition X.

Furthermore, the electrode material may be configured as a powder (for example, with an average particle diameter of about 1 micrometer to 5 micrometers) or a disintegrated product (for example, with an average particle diameter of about 5 micrometers to 500 micrometers), or may be a agglomerate that is larger than the disintegrated product.

The electrode material preferably includes a highly uniform composition distribution. More specifically, a value of the standard deviation for the atomic percentage of respective elements contained at the A site are acquired by use of energy dispersive X-ray spectroscopy (EDS) at 10 spots in an arbitrary field in the electrode material is preferably no more than 10.3.

For example, it is assumed that n types of elements A1, A2, A3, . . . An are contained at the A site. When the value of the standard deviation for the atomic percentage of the respective elements is acquired with reference to the atomic percentage obtained at 10 spots, if the value of the standard deviation for the atomic percentage for the element A1 is larger than the respective values for the standard deviation of the elements A2-An, it is preferred that the value of the standard deviation of the element A1 is no more than 10.3.

The arbitrary field as used herein is suitably within a range observed by an electron microscope such as an electron probe micro analyzer (EPMA) or a scanning electron microscope (SEM), or the like with a magnification of 100 times to 5000 times. The analysis spot size of the respective 10 spots may be no more than 1 micrometer. When the distribution of the atomic percentage as described below is evaluated based on an observation at an excessively small magnification of less than 100 times, there are difficulties associated with the determination of the uniformity of the distribution of each element in the micro range that is the object of the present invention. On the other hand, when the distribution of the atomic percentage is evaluated based on an observation at an excessively large magnification that exceeds 5000 times, there is an increased possibility that only a non-uniform region or only a uniform region will be observed as a result of the narrow observation range. As a result, as stated above, it is preferred that the magnification of the electron microscope is in the range of 100 times to 5000 times.

The position of the 10 spots may be selected for example on the basis of the concentration level in 10 stages that are determined in response to the distribution of the atomic percentages measured using an electron probe micro analyzer (EPMA). The concentration level in the 10 stages is preferably set with reference to substantially the entire range of the distribution of the atomic percentages. For example, the concentration level in the 10 stages can be set by creating 10 divisions in the interval between the maximum value and the minimum value in the characteristic X-ray intensity in the arbitrary field.

Method of Manufacturing Electrode Material

An example of a method of manufacturing the electrode material described in "Section 1." above will be described below.

More specifically, the method of manufacture includes acquisition of a complex oxide compound having a perovskite structure.

The method of obtaining the complex oxide compound includes a solid phase method, a liquid phase method (citrate process, Pechini method, co-precipitation method) or the like.

A "solid phase method" refers to a method in which a mixture obtained by mixing a starting material (powder) including constituent elements at a predetermined ratio is fired, and then subjected to comminution to obtain the target material.

A "liquid phase method" is a method for obtaining a target material that includes the steps of dissolving a starting material including constituent elements into a solution, obtaining a precursor of the target material from the solution by precipitation or the like, and then performing drying, firing and comminution.

The sequence of steps will be described below making reference to the figures in relation to a configuration in which the electrode material is manufactured using a solid phase method, and a configuration in which the electrode material is manufactured using a liquid phase method.

2-1 Method of Manufacturing Electrode Materials Using Solid Phase Method

FIG. 1 is a flowchart describing a method of manufacturing an electrode material using a solid phase method.

Firstly, in a step S101, a starting material is prepared according to the type of complex oxide. When manufacturing LSCF as a complex oxide, for example, $La_2O_3$, $SrCO_3$, $Co_3O_4$ and $Fe_2O_3$ are prepared. The average particle diameter of $La_2O_3$ may be 0.1 micrometer to 0.7 micrometer, the average particle diameter of $SrCO_3$ may be 0.1 micrometer to 0.5 micrometer, the average particle diameter of $Co_3O_4$ may be 0.1 micrometer to 1.0 micrometer, and the average particle diameter of $Fe_2O_3$ may be 0.1 micrometer to 0.8 micrometer. Furthermore, it is preferred that the particle size distribution of the starting material is controlled. More specifically, it is desirable that coarse particles of greater than or equal to 20 micrometers are removed in advance by use of an air classifier or the like. The removal of coarse particles is effective for uniformity when executing mixing and synthesizing in subsequent steps.

Next, in step S102, the starting materials are classified. More specifically, for example, the specific surface area of each starting material is adjusted by classification using an air classifier or example. When manufacturing LSCF as a complex oxide, the specific surface area of $La_2O_3$ is adjusted to 1 $m^2/g$ to 5 $m^2/g$, the specific surface area of $SrCO_3$ is adjusted to 1 $m^2/g$ to 7 $m^2/g$, the specific surface area of $Co_3O_4$ is adjusted to 1 $m^2/g$ to 7 $m^2/g$, and the specific surface area of $Fe_2O_3$ is adjusted to 1 $m^2/g$ to 10 $m^2/g$.

Next, in a step S103, the respective starting materials are mixed at a predetermined mixing ratio. In the present embodiment, the mixing process preferably includes the steps of weighing the respective starting materials at a predetermined mixing ratio and placing the materials into a pot mill together with pebbles (for example, application is possible of the pebbles used in the manufacture of zirconia or alumina), rotating the pot mill for a predetermined time (10 hrs to 120 hrs) in a dry state and then introducing a predetermined amount (weight ratio relative to the starting material of 50% to 200%) of solvent (for example, when using an aqueous solvent, ion-exchanged water may be used, and when using a solvent-based material, acetone may be used), and rotating the pot mill further for a predetermined time (10 hr to 300 hr) in a wet state. When performing a uniform mixture of respective starting material powders using wet mixing, it is preferred to perform sufficient disintegration under suitable mixing conditions of the starting material powder using dry mixing. The pebbles preferably have a diameter of 0.5 mm to 5 mm, and are preferably adjusted to 0.5 to 3 times the weight of the starting material powder.

In this mixing process, it is preferred to add a predetermined additive to the respective starting materials. The additives are phosphorus (P), chrome (Cr), and boron (B). The added amount of P is preferably at least 1 ppm to no more than 50 ppm in a weight ratio relative to the starting materials, and more preferably at least 1 ppm and no more than 30 ppm. The added amount of Cr is preferably at least 1 ppm to no more than 500 ppm in a weight ratio relative to the starting materials, and more preferably at least 1 ppm and no more than 100 ppm. The added amount of B is preferably at least 1 ppm to no more than 50 ppm in a weight ratio relative to the starting materials, and more preferably at least 1 ppm and no more than 10 ppm. The additives are preferably added as oxides. The additives have the function of creating a uniform dispersion and mixture in the constituent components. In addition to comminution of the starting materials in a dry mix in the previous step, an important factor in the control (uniformity) of the composition distribution of the electrode material is the combination of a process of wet mixing in later steps. The mixing ratio of each starting material when manufacturing LSCF as a complex oxide may be performed by adjusting the starting material ratio of $La_2O_3$, $SrCO_3$, $Co_3O_4$ and $Fe_2O_3$ in accordance with the composition of the complex oxide.

Next, in step S104, the electrode material is synthesized by firing of the starting materials mixed in the pot mill. The synthesis conditions may be suitably adjusted within a range of a synthesis temperature of 900 degrees C. to 1400 degrees C. and a synthesis time of 1 to 30 hrs in an oxidizing atmosphere.

Next, in step S105, the electrode material in a synthesized agglomerated configuration is subjected to comminution. More specifically, the average particle diameter of the electrode material is adjusted to 0.3 micrometers to 1.2 micrometers by introducing the electrode material with pebbles (for example, application is possible of the pebbles used in the manufacture of zirconia or alumina) into the pot mill and rotating for a predetermined time (5 hrs to 20 hrs). Furthermore, prior to comminution, the electrode material in an agglomerated configuration may be subjected to preparatory disintegration.

Next, in step S106, the electrode material after comminution is classified. More specifically, the specific surface area of each starting material is adjusted by classification using an air classifier or the like. When manufacturing LSCF as a complex oxide, the specific surface area is adjusted to 3 $m^2/g$ to 12 $m^2/g$.

2-2 Method of Manufacture of Electrode Material Using Liquid-Phase Method

Figure 2:
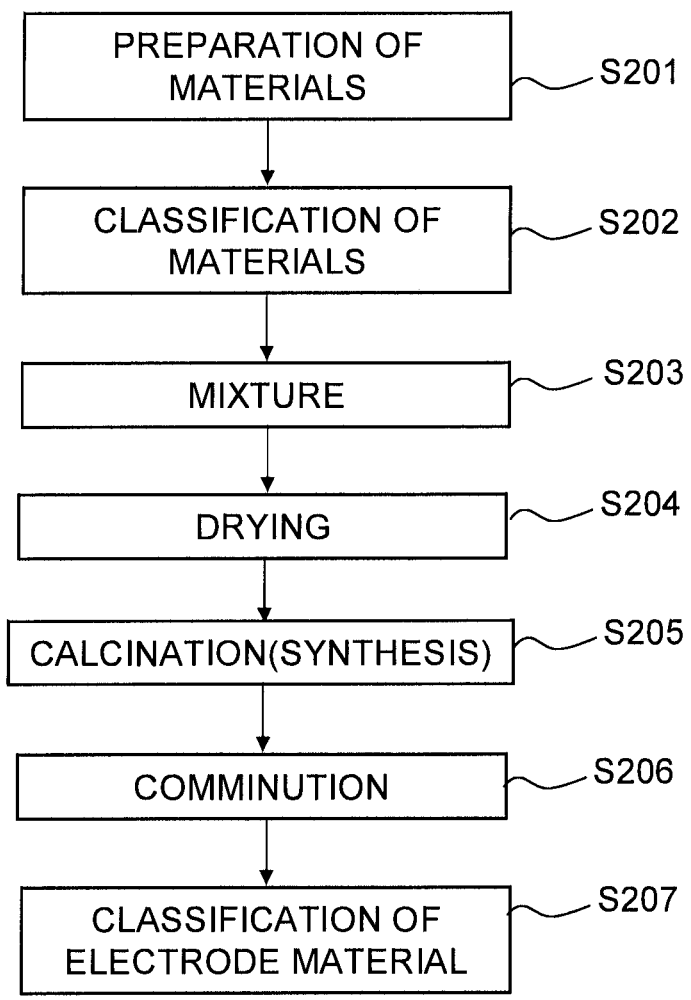
FIG. 2 is a flowchart describing a method of manufacturing an electrode material using a liquid-phase method.

FIG. 2 is a flowchart describing a method of manufacturing an electrode material using a liquid-phase method.

Firstly, in step S201, a starting material is prepared corresponding to the type of complex oxide. When manufacturing LSCF as the complex oxide by use of a co-precipitation method or citrate method, $La(NO_3)_3.6H_2O$, $Sr(NO_3)_2$, $Co(NO_3)_3.9H_2O$ and $Fe(NO_3)_3.9H_2O$ are prepared. The average particle diameter of $La(NO_3)_3.6H_2O$ may be 0.3 micrometers to 0.6 micrometers, the average particle diameter of $Sr(NO_3)_2$ may be 0.1 micrometers to 0.4 micrometers, the average particle diameter of $Co(NO_3)_3.9H_2O$ may be 0.2 micrometers to 0.5 micrometers, and the average particle diameter of $Fe(NO_3)_3.9H_2O$ may be 0.3 micrometers to 0.8 micrometers. When manufacturing LSCF using a Pechini method, $La_2O_3$, $SrO_3$, $Co_3O_4$ and $Fe(NO_3)_3.9H_2O$ are prepared to have the above average particle diameter. Furthermore, controlling the particle size distribution of the starting materials is important. More specifically, it is desirable to remove coarse particles of greater than or equal to 15 micrometers in advance by use of an air classifier. The removal of coarse particles is effective for uniformity when executing mixing and synthesizing (calcinating) in subsequent steps.

Next, in step S202, the starting materials are classified. More specifically, for example, the specific surface area of each starting material is adjusted by classification using an air classifier. When manufacturing LSCF as a complex oxide by use of co-precipitation or a citrate method, the specific surface area of $La(NO_3)_3.6H_2O$ is adjusted to 2 $m^2/g$-8 $m^2/g$, the specific surface area of $Sr(NO_3)_2$ is adjusted to 1 $m^2/g$-5 $m^2/g$, the specific surface area of $Co(NO_3)_3.9H_2O$ is adjusted to 2 $m^2/g$-5 $m^2/g$, and the specific surface area of $Fe(NO_3)_3.9H_2O$ is adjusted to 3 $m^2/g$-10 $m^2/g$.

Next, in a step S203, the respective starting materials are mixed at a predetermined mixing ratio. More specifically, when manufacturing LSCF by use of co-precipitation, after dissolving the starting materials in a pure state to prepare a 0.2M aqueous solution, an aqueous nitrate solution is added while stirring in a precipitation agent. When preparing the LSCF using a citrate method, the respective starting materials are dissolved in a pure state and citric acid is added until all the metal is precipitated, and the viscosity is adjusted by use of heating after immersion to approximately 60 degrees C. to dehydrate. When preparing LSCF using a Pechini method, after preparing an aqueous nitrate solution for each of the starting materials and mixing all solutions, citric acid and ethylene glycol are added.

In this mixing process, it is preferred to add a predetermined additive to the respective starting materials. The additives are phosphorus (P), chrome (Cr), and boron (B). The concentration of P contained in the additive is preferably at least 1 ppm to no more than 50 ppm in a weight ratio relative to the starting materials, and more preferably at least 1 ppm and no more than 30 ppm. The concentration of Cr contained in the additive is preferably at least 1 ppm to no more than 500 ppm in a weight ratio relative to the starting materials, and more preferably at least 1 ppm and no more than 100 ppm. The concentration of B contained in the additive is preferably at least 1 ppm to no more than 50 ppm in a weight ratio relative to the starting materials, and more preferably at least 1 ppm and no more than 10 ppm. The additives have the function of creating a uniform dispersion and mixture in the constituent components, or during thermal synthesis processes, and non-uniformity in each of the elements (for example, resulting from phase splitting, heterogeneous phase precipitation, or the like) can be inhibited as a result of these additives. As a result, uniformity of the composition distribution of the electrode material is enabled by suitable control of the added amount of the additives.

Next, in step S204, the aqueous solution prepared in step S203 is dried. When using co-precipitation, vacuum drying is used at approximately 110 degrees C., when using a citrate method, drying is performed at approximately 70 degrees C., and when using a Pechini method, drying is performed at approximately 200 degrees C.

Next, in step S205, the electrode material is synthesized by firing of the dried starting materials. The synthesis conditions are suitably adjusted within a range of a synthesis temperature of 900 degrees C. to 1400 degrees C. and a synthesis time of 1 to 30 hrs in an oxidizing atmosphere.

Next, in step S206, the electrode material that is in a configuration of a synthesized agglomerate is subjected to comminution. In step S207, the electrode material after comminution is classified. The details of these steps are the same as steps S105 and S106 described above.

Vertically-Striped Fuel Cell (Solid Oxide Fuel Cell)

A solid oxide fuel cell is an example of a fuel cell. In particular, a SOFC will be mainly described that has a cell stack structure in which a plurality of fuel cells are stacked.

Overview of Fuel Cell

Figure 3:
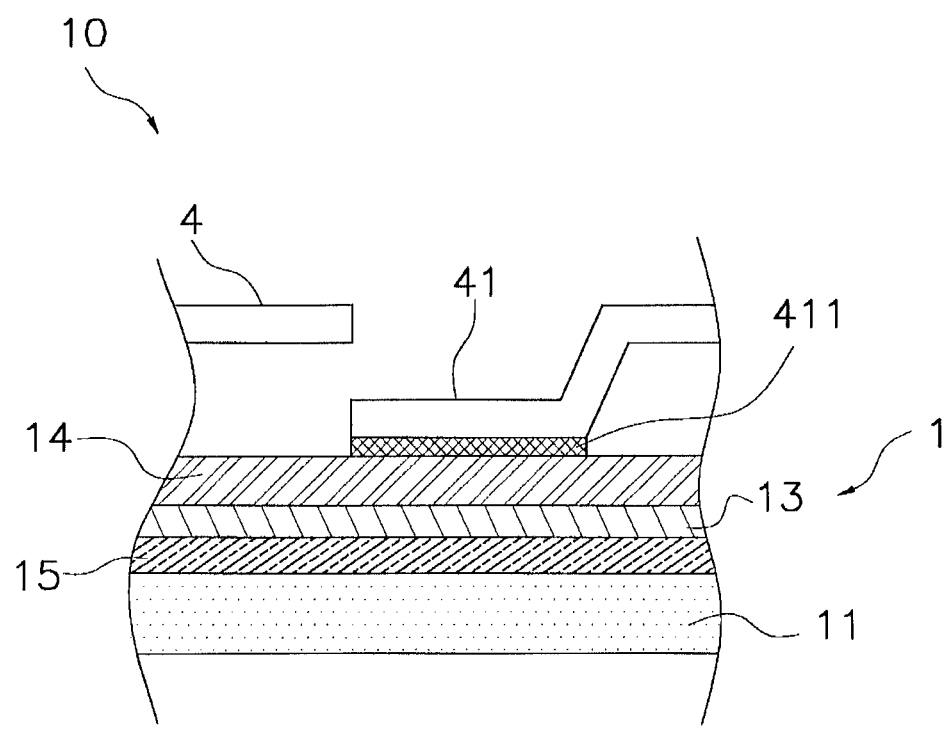
FIG. 3 is a sectional view illustrating the principal features of configuration of a vertically-striped fuel cell.

As illustrated in FIG. 3, the fuel cell 10 includes a fuel cell (hereinafter simply referred to as "cell") 1, and a current collecting member 4.

3-2 Overview of Cell 1

The cell 1 is a thin ceramic plate. The thickness of the cell 1 is for example 30 micrometers to 700 micrometers, and the diameter of the cell 1 is for example 5 mm to 50 mm. The cell 1 as illustrated in FIG. 3 includes an anode 11, a barrier layer 13, a cathode 14, and an electrolyte layer 15 (solid electrolyte layer).

3-3 Anode

The material used in the anode 11 for example includes a material used in the formation of the anode in a known fuel cell. More specifically, the material used in the anode 11 may include NiO-YSZ (nickel oxide-yttria-stabilized zirconia) and/or NiO-$Y_2O_3$ (nickel oxide-yttria). The anode 11 may include these materials as a main component. The anode 11 functions as the anode.

Furthermore, the anode 11 may function as a base plate that supports the other layers included in the cell 1 (in other words, a support body). That is to say, the thickness of the anode 11 may have the maximum thickness of the plurality of layers contained in the cell 1. More specifically, the thickness of the anode 11 is of the order of 10 micrometers to 600 micrometers.

The anode 11 can be imparted with conductive properties by application of a reduction treatment (for example, a treatment of reducing NiO to Ni).

The anode 11 may include at least two layers. For example, the anode 11 may have two layers, that is to say, a base plate and an anode-active layer (fuel-side electrode) formed thereon. The material in the base plate is configured by a material that includes properties such as electron conductivity. The anode-active layer is configured by a material that includes properties such as electron conductivity and properties such as oxidizing ion (oxygen ion) conductivity. The "proportion of the volume of material that has oxidizing ion (oxygen ion) conductivity relative to the total volume excluding the pores" in the anode active layer is greater than the "proportion of the volume of material that has oxidizing ion (oxygen ion) conductivity relative to the total volume excluding the pores" in the base plate. The material in the base plate and the anode active layer can be selected from the materials for the anode 11 described above. More specifically, a combination is possible of a base plate configured from $NiO-Y_2O_3$ and the anode active layer configured by NiO-YSZ.

3-4 Barrier Layer

The barrier layer 13 is provided between the cathode 14 and the anode 11, and more specifically, is provided between the cathode 14 and the electrolyte layer 15.

The barrier layer 13 includes cerium. The barrier layer may include cerium as the ceria (cerium oxide). More specifically, materials that are used in the bather layer 13 include ceria and ceria-based materials including rare-earth metal oxides configured as a solid solution in ceria. The barrier layer 13 may include a ceria-based material as a main component.

More specifically, the ceria-based material includes GDC ($(Ce, Gd)O_2$: gadolinium doped ceria), and SDC ($(Ce, Sm)O_2$: samarium doped ceria). The concentration of the rare earth metal in the ceria-based material is preferably 5 to 20 mol %. The barrier layer 13 may include an additive in addition to a ceria-based material.

The thickness of the barrier layer 13 is no more than 30 micrometers.

The barrier layer 13 suppresses the diffusion of cations from the cathode 14 into the electrolyte layer 15. As a result, the barrier layer 13 enables suppression of a reduction in the output density, and increases the product life of the cell 1.

3-5 Cathode

The cathode 14 is configured using electrode materials as described in "Section 1." above. This type of cathode 14 preferably includes an additive (P, Cr, and B) at a predetermined weight ratio relative to the total weight of the electrode material. In this configuration, the content amount of P is preferably at least 1 ppm to no more than 50 ppm in a weight ratio relative to the starting materials, and more preferably at least 1 ppm and no more than 30 ppm. The content amount of Cr is preferably at least 1 ppm to no more than 500 ppm in a weight ratio relative to the starting materials, and more preferably at least 1 ppm and no more than 100 ppm. The content amount of B is preferably at least 1 ppm to no more than 50 ppm in a weight ratio relative to the starting materials, and more preferably at least 1 ppm and no more than 10 ppm.

The thickness of the cathode 14 may be of the order of 5 micrometers to 50 micrometers.

3-6 Electrolyte Layer

The electrolyte layer 15 is provided between the barrier layer 13 and the anode 11.

The electrolyte layer 15 includes zirconium. The electrolyte layer 15 may include zirconium in the form of zirconia ($ZrO_2$). More specifically, the electrolyte layer 15 may include zirconia as a main component. The electrolyte layer 15 may include an additive such as $Y_2O_3$ and/or $Sc_2O_3$ in addition to zirconia. These additives may function as a stabilizer. The added amount of the additive in the electrolyte layer 15 is of the order of 3 to 20 mol %. In other words, the material used in the electrolyte layer 15 includes yttria-stabilized zirconia such as 3YSZ, 8YSZ, and 10YSZ or zirconia-based materials such as ScSZ (scandia-stablized zirconia).

The thickness of the electrolyte layer 15 may be no more than 30 micrometers.

3-7 Current Collecting Member

A current collecting member 4 includes a plurality of conductive connection portions 41.

As illustrated in FIG. 3, the conductive connection portions 41 are configured as an depressed portion provided in the current collecting member 4, and the bottom portion thereof is connected through a conductive adhesive 411 to the cathode 14. The bottom portion of the conductive connection portions 411 includes a periphery and a non-connected position.

During power generation, fuel gas is supplied to the anode 11. The supply of air to the cathode 14 draws air from the side surface of the cell stack structure (for example, the front of the face of the page in FIG. 3).

Although this is not shown, the fuel cell 10 further includes a member such as a lead that sends a current generated by the cell stack to an external apparatus, and a gas reforming unit that includes a catalyst or the like for reforming the fuel gas.

Method of Manufacturing Fuel Cell 4-1 Formation of Anode

The anode 11 can be formed by powder compaction. That is to say, the anode 11 may include the feature of introducing powder, in which material for the anode 11 is mixed, into a mold, and compressing to thereby mold a compacted powder body.

The material for the anode 11 may be configured according to the description above in relation to the configuration of the fuel cell. The material includes use of nickel oxide, zirconia and a pore forming agent as required. A pore forming agent is an additive that forms pores in the anode. The pore forming agent includes use of a material that is removed in later processing steps. Examples of such materials include cellulose powder.

This is no particular limitation on the mixing ratio of the material, and the mixing ratio may be suitably set in response to the characteristics or the like required by the fuel cell.

The pressure applied to the powder during powder compaction molding is set to impart sufficient rigidity to the anode.

The internal structure of the anode 11 such as the gas conduit (not shown) is formed by powder compaction molding in a configuration in which a member that is removed by firing (a cellulose sheet or the like) is disposed in an inner portion of the powder body and then firing is performed.

4-2 Formation of Electrolyte Layer

The method of manufacturing the fuel cell includes formation of the electrolyte layer on a molded body of the anode formed by powder compaction.

The method of formation of the electrolyte is a method such as CIP (cold isostatic pressing) that uses an electrolyte material that is processed into a sheet configuration, or thermo-compression bonding. Otherwise, a slurry dip method may be used in which the anode is immersed into an electrolyte material adjusted to a slurry configuration. When using the CIP method, the pressure during the pressing operation on the sheet is preferably 50 to 300 MPa.

4-3 Firing

The method of manufacturing the fuel cell includes co-firing (co-sintering) of the electrolyte layer and the anode formed by powder compaction. The temperature and the time for firing are set in response to the cell material.

4-4 Degreasing

Degreasing may be performed prior to firing in 4-3. The degreasing is executed by heating. The conditions such as temperature and time are set in response to the material of the cell or the like.

4-5 Formation of Cathode

The cathode is formed by firing after formation of a layer of material for the cathode by a printing method, powder compaction or the like on a stacked body of the barrier layer, the electrolyte layer and the anode. More specifically, in case of an electrode material configured from LSCF, when using a printing method, a paste prepared by mixing LSCF together with a binder, dispersal agent and dispersal medium is printed onto the stacked body and fired (firing temperature 900 degrees C. to 1100 degrees C., and firing time 1 hr to 10 hrs).

4-6 Other Processing Steps

Other steps may be included in the manufacturing method depending on the configuration of the fuel cell. For example, the manufacturing method may include a step of providing a reaction prevention layer between the electrolyte layer and the cathode, or may include a step of forming a double layered structure in the anode (a step of forming the base plate and a step of forming the anode active layer).

5. Segmented-in-Series Fuel Cell

The fuel cell 10 described above includes a plurality of stacked cells 1 and a current collecting member 4 connecting the cells 1 electrically. In other words, the fuel cell 10 is a vertically-striped fuel cell. However, the technique disclosed herein may also be applied to a segmented-in-series fuel cell. A segmented-in-series fuel cell will be described below.

Figure 6:
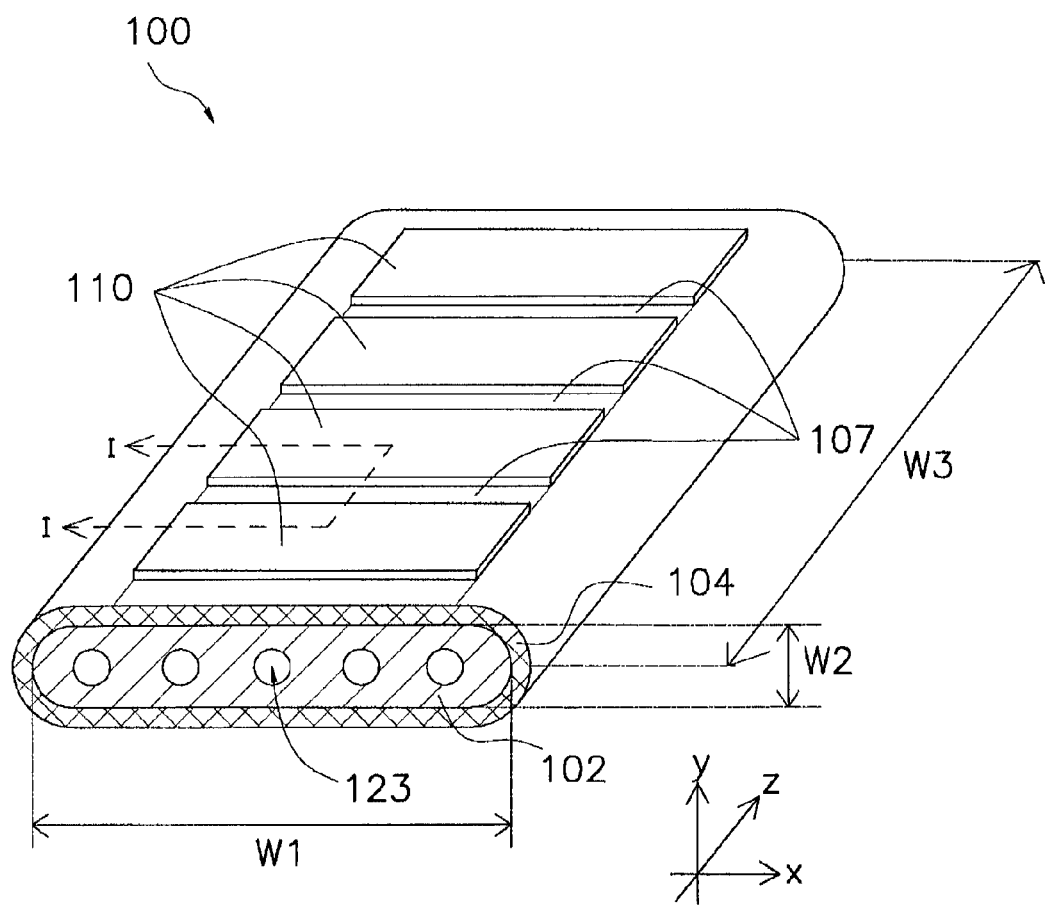
FIG. 6 is a perspective view illustrating the external appearance of a segmented-in-series fuel cell.

The segmented-in-series fuel cell (hereinafter simply referred to as a "fuel cell") 100 includes a support base plate 102, an anode 103, an electrolyte layer 104, a cathode 106, an interconnector 107, a current collecting unit 108, and a barrier layer 13. The fuel cell 100 includes a plurality of cells 110. Those component elements that are the same as the component elements already described above are denoted by the same reference numerals, and such description will not be repeated. In FIG. 6, for sake of convenience of description, the current collecting unit 108 is not illustrated.

The fuel cell 100 includes the cells 110 disposed on the support base plate 102 and an interconnector 107 that electrically connects the cells 110. The cells 110 are units that include an anode 103 and a cathode 106 that corresponds to the anode 103. More specifically, the cells 110 include an anode 103, an electrolyte layer 104 and a cathode 106 stacked in the thickness direction (y axis direction) of the support base plate 102. The anode 103, the electrolyte layer 104 and the cathode 106 configure the power generation element of the cell 110.

The support base plate 102 is flat and elongated in one direction (z axis direction). The support base plate 102 is a porous body that has electrical insulating properties. The support base plate 102 may include nickel. More specifically, the support base plate 102 may contain Ni-$Y_2O_3$ (nickel yttria) as a main component. The nickel may be included as an oxide (NiO). During power generation, NiO may be reduced to Ni by hydrogen gas.

Figure 7:
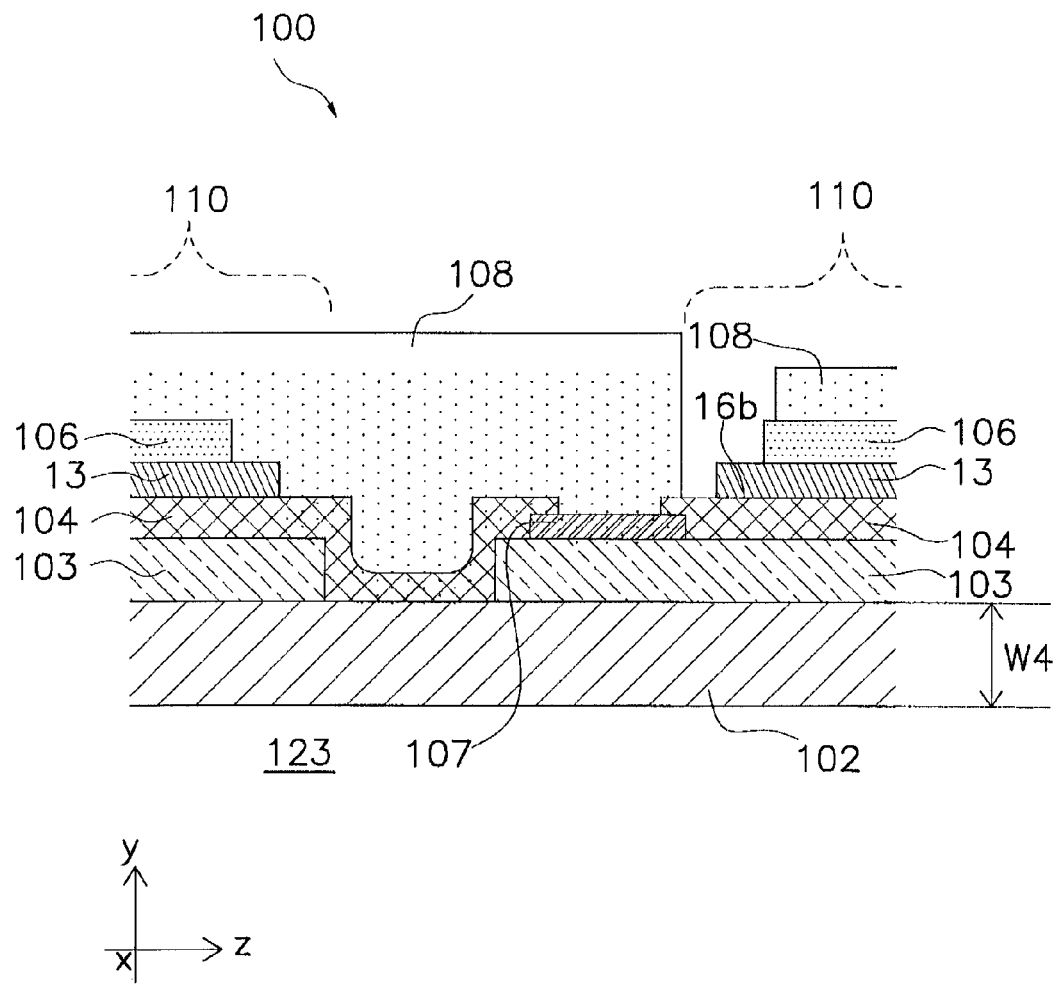
FIG. 7 is a sectional view along the direction I-I of the arrow in FIG. 6.

As illustrated in FIG. 6 and FIG. 7, a conduit 123 is provided in an inner portion of the support base plate 102. The conduit 123 extends along the longitudinal direction (z axis direction) of the support base plate 102. During power generation, fuel gas flows into the conduit 123, through a hole that is provided in the support base plate 102 to thereby supply fuel gas to the anode 103 described below.

The anode 103 is provided on the support base plate 102. A plurality of anodes 103 is disposed on a single support base plate 102 and is arranged in the longitudinal direction (z axial direction) of the support base plate 102. That is to say, a space is provided between adjacent anodes 103 with respect to the longitudinal direction (z axis direction) of the support base plate 102.

The composition of the anode 103 may be the same as the composition of the anode 11.

The anode 103 may include an anode current collecting layer and an anode active layer. The anode current collecting layer is provided on the support base plate 102, and the anode active layer is provided on the anode current collecting layer while avoiding superimposition with respect to the interconnector 107.

The anode 103 may include an anode current collecting layer and an anode active layer. The anode current collecting layer is provided on the support base plate 102 and the anode active layer is provided on the anode current collecting layer. The composition of the anode current collecting layer and the anode active layer has been described above.

The electrolyte layer 104 is also termed a solid electrolyte layer. As illustrated in FIG. 7, the electrolyte layer 104 is provided on the anode 103. In a region that is not provided with the anode 103 on the support base plate 102, the electrolyte layer 104 may be provided on the support base plate 102.

The electrolyte layer 104 includes a non-connected position in the longitudinal direction (z axis direction) of the support base plate 102. In other words, a plurality of electrolyte layers 104 is disposed at an interval in the z axis direction. Namely, a plurality of electrolyte layers 104 is provided along the longitudinal direction (z axis direction) of a single support base plate 102.

Electrolyte layers 104 adjacent in the z axis direction are connected by an interconnector 107. In other words, the electrolyte layers 104 are connected from an interconnector 107 to an interconnector 107 that is adjacent to that interconnector 107 in the longitudinal direction (z axis direction) of the support base plate 102. The interconnector 107 and the electrolyte layer 104 have a dense structure in comparison to the support base plate 102 and the anode 103. Therefore, the interconnector 107 and the electrolyte layer 104 function as a sealing portion that partitions air and fuel gas by the provision of a connected structure in the z axis direction in the fuel cell 100.

The composition of the electrolyte layer 104 may include a composition that is the same as the electrolyte layer 15 as described above.

The same description provided in relation to the vertical-striped fuel cell applies to the configuration of the barrier layer 13. The barrier layer 13 is provided between the cathode 106 and the electrolyte layer 104.

The cathode 106 is disposed on the barrier layer 13 without projecting from the outer edge of the barrier layer 13. One cathode 106 is stacked on one anode 103. That is to say, a plurality of cathodes 106 is provided along the longitudinal direction (z axis direction) of the support base plate 102 on a single support base plate 102.

The composition of the cathode 106 is configured with the electrode material described in "Section 1." above in the same manner as the cathode 14 described above. The cathode 106 preferably includes an additive (P, Cr, and B) at a predetermined weight ratio relative to the total weight of the electrode material in the same manner as the cathode 15 of the vertically-striped fuel cell described above. In this configuration, the content amount of P is preferably at least 1 ppm to no more than 50 ppm in a weight ratio relative to the starting materials, and more preferably at least 1 ppm and no more than 30 ppm. The content amount of Cr is preferably at least 1 ppm to no more than 500 ppm in a weight ratio relative to the starting materials, and more preferably at least 1 ppm and no more than 100 ppm. The content amount of B is preferably at least 1 ppm to no more than 50 ppm in a weight ratio relative to the starting materials, and more preferably at least 1 ppm and no more than 10 ppm.

As described above, the interconnector 107 may be disposed to configure electrical contact between the cells 110. In FIG. 7, the interconnector 107 is stacked onto the anode 103.

In the present specification, "stack" includes the disposition of two elements in connection, and a disposition that provides an overlap in the y axis direction although there is not a connection.

In FIG. 7, as described above, the interconnector 107 is disposed to span the interval between the electrolyte layers 104 in the longitudinal direction (z axis direction) of the support base plate 102. In this manner, cells 110 that are adjacent in the longitudinal direction (z axis direction) of the support base plate 102 are electrically connected.

The interconnector 107 configures an electrode that is used for the electrical connection between the plurality of cells 110. More specifically, the interconnector 107 illustrated in FIG. 7 functions as an electrode for the cells 110 disposed on the right side of FIG. 7.

The interconnector 107 that configures the electrode as described above is configured using the electrode material described in "Section 1." above in the same manner as the cathode 106 described above.

That is to say, the interconnector 107 includes a main component of a perovskite complex oxide as a main component. In particular, a chromite-based material such as lanthanum chromite ($LaCrO_3$) is an example of a perovskite complex oxide used in the interconnector 107.

The composition formula for the lanthanum chromite is expressed by general formula (1) below.

$$Ln_{1-x}A_xCr_{1-y-z}B_yO_3 \quad (1)$$

In Formula (1), wherein Ln is at least one type of element selected from the group of Y and a lanthanoid, A is at least one type of element selected from the group of Ca, Sr and Ba, and B is at least one type of element selected from the group of Ti, V, Mn, Fe, Co, Cu, Ni, Zn, Mg and Al, and wherein $0.025 \leq x \leq 0.3$, $0 \leq y \leq 0.22$, $0 \leq z \leq 0.15$.

Lanthanum chromite is a material that can stably exist under both an atmospheric and reducing atmosphere at the operating temperature (600 to 1000 degrees C.) of the SOFC, and is preferably used as an interconnector material (electrode material) of an SOFC cell that includes horizontal stripes.

However, it is known that lanthanum chromite is a sintering resistant material, and addition is required of an additive that facilitates firing, such as a sintering agent (CaO, SrO, or the like), to co-sinter with the support base plate 102, the anode 103 and the electrolyte layer 104 for application to the SOFC cell.

As a result, as described above, a highly uniform composition distribution is preferred also in the interconnector material (electrode material) to which the sintering agent is added. More specifically, a value of the standard deviation for the atomic percentage of respective elements contained at the A site are acquired by use of energy dispersive X-ray spectroscopy (EDS) at 10 spots in an arbitrary field in the electrode material is preferably no more than 10.3.

In this manner, since the overall interconnector 107 can be imparted with a dense configuration, the localized occurrence of a region of insufficient firing (pinholes) in the interconnector 107 can be suppressed. As a result, it is possible to improve the reliability of the interconnector 107.

The current collecting unit 108 is disposed to electrically connect the interconnector 107 and the cell 110. More specifically, the current collecting unit 108 is provides a connection from the cathode 106 to the interconnector 107 that is included in the cell 110 that is adjacent to the cell 110 that includes the cathode 106. The current collecting unit 108 may include conductive properties.

The cathode 106 that is included in the cell 110 is electrically connected to the anode 103 of the adjacent cell 110 through the current collecting unit 108 and the interconnector 107. That is to say, the current collecting unit 108 participates in the connection between cells 110 in addition to the interconnector 107.

The specific dimensions of each component of the fuel cell 100 may be set as shown below.

Width W1 of support base plate 102: 1 to 10 cm
Thickness W2 of support base plate 102: 1 to 10 mm
Length W3 of support base plate 102: 5 to 50 cm
Distance W4 from outer surface of support base plate 102 (interface between support base plate 102 and anode) to conduit 123: 0.1-4 mm
Thickness of Anode 103: 50-500 micrometers (When the anode 103 includes an anode current collecting layer and an anode active layer: thickness of anode current collecting layer: 50-500 micrometers, thickness of anode active layer: 5-30 micrometers)
Thickness of electrolyte layer 104: 3-50 micrometers
Thickness of cathode 106: 10-100 micrometers
Thickness of interconnector 107: 10-100 micrometers
Thickness of current collecting unit 108: 50-500 micrometers The dimensions described in relation to a vertically-striped fuel cell may be adopted for the constituent elements that are not specifically disclosed. However it goes without saying that the technique herein disclosed is not limited to these values.

(Additional Note)

The cathode material of the solid oxide fuel cell includes a complex oxide material that has a perovskite structure expressed by the general formula $ABO_3$. The complex oxide is preferably such that P is at least 1 ppm and no more than 50 ppm, Cr is at least 1 ppm and no more than 500 ppm, and B is at least 1 ppm and no more than 50 ppm in a weight ratio relative to the total weight of the complex oxide.

In the cathode material, the content amount of P included in the complex oxide is more preferably no more than 30 ppm in a weight ratio relative to the total weight of the complex oxide.

In the cathode material, the content amount of Cr included in the complex oxide is more preferably no more than 100 ppm in a weight ratio relative to the total weight of the complex oxide.

In the cathode material, the content amount of B included in the complex oxide is more preferably no more than 10 ppm in a weight ratio relative to the total weight of the complex oxide.

In the cathode material, the respective content amount of P, Cr and B in the complex oxide is preferably at least 1 ppm.

EXAMPLES

Preparation of Cell

An NiO-8YSZ anode active layer (10 micrometers), an 8YSZ electrolyte layer (3 micrometers) and a GDC barrier layer (3 micrometers) are stacked on an NiO-8YSZ anode base plate (500 micrometers), and fired under conditions of 1400 degrees C. for 2 hours.

As illustrated in Table 1 to Table 3, 10 types of electrode materials (No. 1 to No. 10) including $(La_{0.6}Sr_{0.4})(Co_{0.2}Fe_{0.8})O_3$, 6 types of electrode materials (No. 11 to No. 16) including $(La_{0.8}Sr_{0.2})FeO_3$, and 6 types of electrode materials (No. 17 to No. 22) including $(Ni_{0.6}Fe_{0.4})O_3$ were obtained. Then as illustrated in Table 10, 6 types of electrode materials (No. 23 to No. 28) including $(La_{0.6}Sr_{0.4})(Co_{0.2}Fe_{0.8})O_3$ in the same manner as No. 1 to No. 10 were obtained. However, no additives were actively added to No. 28. ICP analysis is used to confirm that the added amount of the additive (at least one of P, Cr and B) during electrode operation corresponds to the content amount of the additive in the electrode material after calcination (synthesis).

Those electrode materials that are expressed using the same general formula but denoted by different reference numerals differ in relation to starting materials, firing conditions, or comminution conditions. Furthermore, the tables indicate whether each electrode material was synthesized using a solid phase method or a liquid phase method. Furthermore, the content amount of the additive (P, Cr or B) included in the electrode material is disclosed in the table.

The average particle diameter of the resulting disintegrated product is 200 micrometers. The disintegrated product was used in the measurement of the composition distribution described below.

The disintegrated product was subjected to comminution using a ball mill apparatus. The average particle diameter of the electrode material (powder) was all no more than 1.0 micrometer upon measurement using a laser diffraction/scattering type particle size distribution measurement apparatus (LA-700 manufactured by Horiba Ltd.).

A paste was prepared using the resulting powder and the paste was used to form a film with a screen printing method resulting in a cathode (30 micrometers) on the barrier layer. The cathode was attached by firing onto the barrier layer by heating to no more than 1000 degrees C. for 2 hours.

SOFCs were obtained in the above manner.

Evaluation

B-1 Measurement of Composition Distribution

The atomic percentage distribution of each element in the disintegrated product formed of electrode material was measured using EPMA. More specifically, measurements are performing using an electron probe micro analyzer manufactured by JEOL Ltd. (model: DCA-8500F). Next, in an arbitrary field, EDS is used to measure the atomic percentage (mol %) of an oxide of each element at the A site and each element at the B site in relation to 10 spots in a section not forming a cavity that can be identified in an SEM image. More specifically, measurements were performed using a field emission scanning electron microscope (model: ULTRA55) manufactured by Zeiss AG (Germany).

Then, the respective concentration of La and Sr at the A site was measured at 10 spots in relation to each of the samples No. 1 to No. 10 to obtain an average value for the La concentration and the standard deviation of the La concentration at each spot and the average value for the Sr concentration and the standard deviation of the Sr concentration at each spot. In the same manner a concentration average value and a standard deviation for the concentration at each spot were obtained for Co and Fe at the B site. Furthermore, the maximum value of the standard deviation in relation to the atomic percentage of elements at the A site and the maximum value of the standard deviation in relation to the atomic percentage of elements at the B site were obtained for each sample No. 1 to No. 10.

The same operation was performed in relation to the concentration of Fe at the B site and La and Sr at the A site for each sample No. 11 to No. 16, and the same operation was performed in relation to the concentration of Fe and Ni at the B site and La at the A site for each sample No. 17 to No. 22.

B-2 Durability Experiments

Continuous power generation was performed using the prepared SOFC cell. The voltage drop rate (deterioration rate) was calculated per 1000 hours using power generation conditions of 750 degrees C. and current density: 0.3 A/cm$^2$. A deterioration rate of no more than 1% was evaluated as "good".

C Results

C-1 No. 1 to No. 10: $(La_{0.6}Sr_{0.4})(Co_{0.2}Fe_{0.8})O_3$

In relation to the samples No. 1 to No. 10, the measurement results for the concentration of No. 1 sample as an example and the results of the calculation of the average value and the standard deviation are shown in Table 1. Table 2 shows the maximum value of the standard deviation for the atomic percentage of each element in relation to samples No. 1 to No. 10. The maximum value of the standard deviation at the A site and the maximum value of the standard deviation at the B site are underlined in relation to each sample. Table 3 shows the maximum value of the standard deviation at the A site and the maximum value of the standard deviation at the B site shown in Table 2, the voltage drop rate (deterioration rate) per 1000 hours, and the evaluation result based on the voltage drop rate for samples No. 1 to No. 10.

Figure 4:
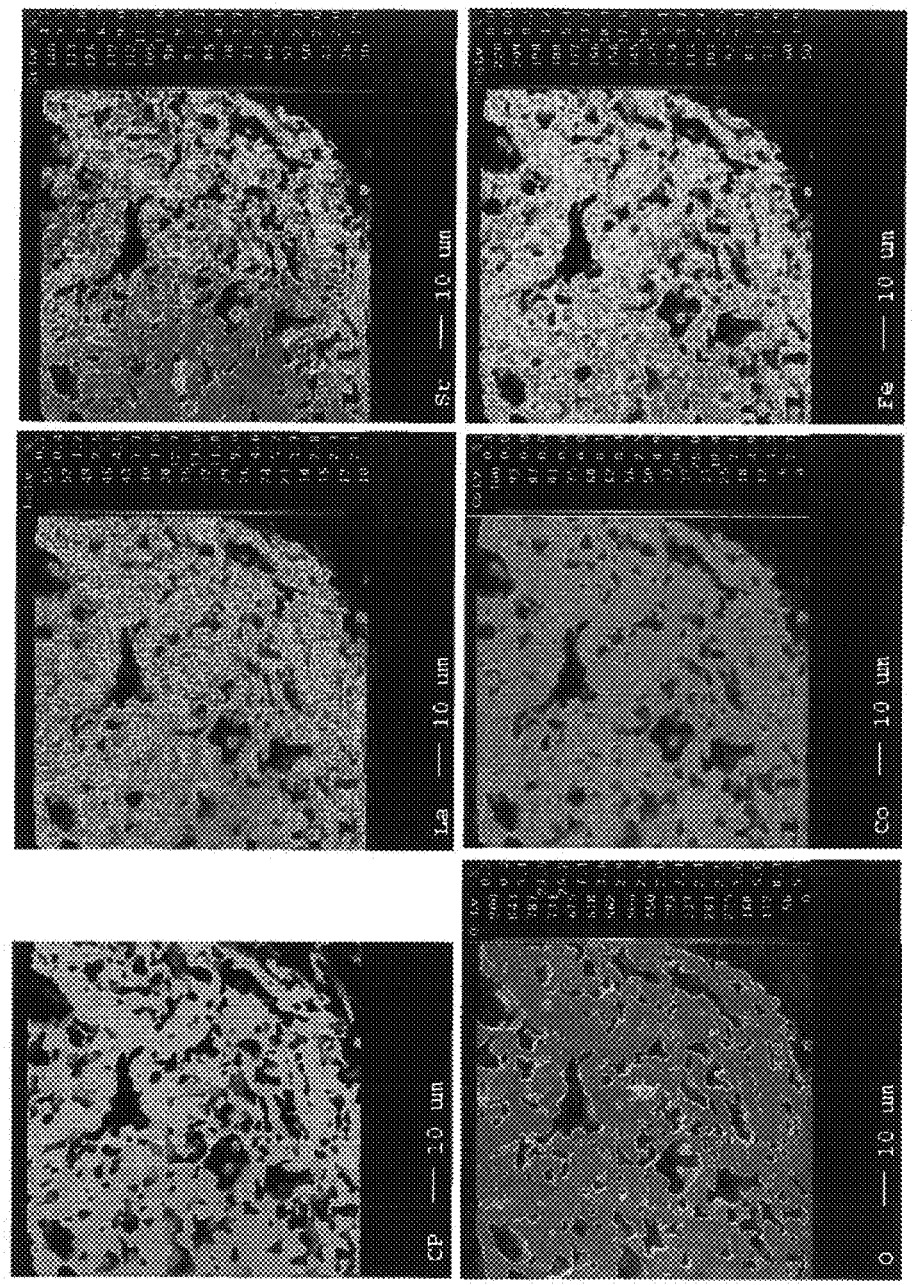
FIG. 4 is a SEM image of a single field and an image of concentration mapping in relation to a sample No. 1 according to the example.
Figure 5:
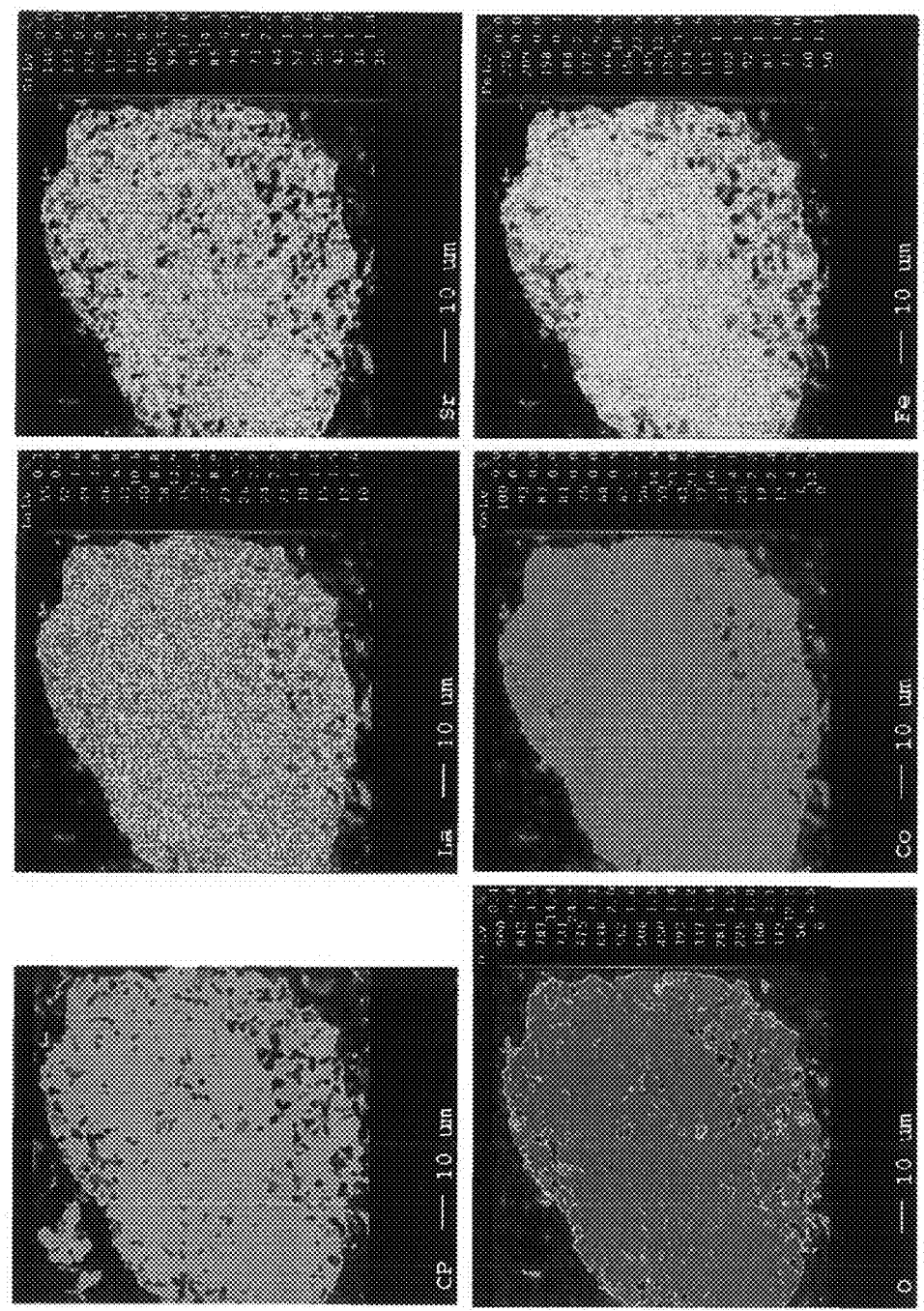
FIG. 5 is a SEM image of a single field and an image of concentration mapping in relation to a sample No. 7 according to the examples.

FIG. 4 and FIG. 5 show respective SEM images and concentration mapping images for the same field in relation to samples No. 1 and No. 7. In FIG. 4 and FIG. 5, the actual positions of high atomic percentage are shown by a red color and positions of low atomic percentage are shown with a blue color.

TABLE 1

Concentration Analysis Results for 10 Spots in Sample No. 1 of $(La_{0.6}Sr_{0.4})(Co_{0.2}Fe_{0.8})O_3$

| Analysis Spot | La (mol %) | Sr (mol %) | Co (mol %) | Fe (mol %) |
|---|---|---|---|---|
| 1 | 17.1 | 30.9 | 6.9 | 45.1 |
| 2 | 19.4 | 28.7 | 6.5 | 45.4 |
| 3 | 24.4 | 22.3 | 7.9 | 45.4 |
| 4 | 24.1 | 22.5 | 8.6 | 44.8 |
| 5 | 22.1 | 28.8 | 7.7 | 42.1 |
| 6 | 29.7 | 20.1 | 9.1 | 41.1 |

TABLE 1-continued

Concentration Analysis Results for 10 Spots in
Sample No. 1 of $(La_{0.6}Sr_{0.4})(Co_{0.2}Fe_{0.8})O_3$

| Analysis Spot | La (mol %) | Sr (mol %) | Co (mol %) | Fe (mol %) |
|---|---|---|---|---|
| 7 | 32.5 | 22.5 | 10.3 | 34.7 |
| 8 | 38.3 | 16.8 | 9.5 | 35.4 |
| 9 | 25.6 | 20.3 | 10.4 | 43.7 |
| 10 | 19.5 | 26.8 | 7.3 | 46.4 |
| Average Value | 25.27 | 23.97 | 8.35 | 42.41 |
| Standard Deviation | 6.23 | 4.34 | 1.36 | 3.99 |

TABLE 2

Maximum Value for Standard Deviation and Additive Content Amount
for Samples No. 1 to No. 10 of $(La_{0.6}Sr_{0.4})(Co_{0.2}Fe_{0.8})O_3$

| Sample No. | Synthesis Method | Standard Deviation | | | | Additive content amount (ppm) | | |
|---|---|---|---|---|---|---|---|---|
| | | A site | | B site | | | | |
| | | La | Sr | Co | Fe | P | Cr | B |
| 1 | Solid phase method | 6.23 | 4.34 | 1.36 | 3.99 | 40 | 400 | 30 |
| 2 | Solid phase method | 3.12 | 4.11 | 0.82 | 1.54 | 35 | 300 | 20 |
| 3 | Solid phase method | 10.3 | 8.32 | 2.87 | 3.61 | 50 | 500 | 50 |
| 4 | Solid phase method | 1.56 | 0.89 | 0.68 | 0.56 | 40 | 250 | 20 |
| 5 | Solid phase method | 7.52 | 13.2 | 4.98 | 2.86 | 70 | 800 | 80 |
| 6 | Solid phase method | 11.5 | 6.32 | 3.15 | 4.88 | 60 | 630 | 60 |
| 7 | Liquid phase method | 0.05 | 0.04 | 0.1 | 0.05 | 20 | 20 | 3 |
| 8 | Liquid phase method | 0.27 | 0.46 | 0 | 0.07 | 30 | 100 | 5 |
| 9 | Liquid phase method | 1.13 | 1.03 | 0.68 | 0.36 | 45 | 460 | 50 |
| 10 | Liquid phase method | 0.2 | 0.25 | 0.03 | 0.05 | 20 | 60 | 10 |

TABLE 3

Evaluation Result for Deterioration Rate and Maximum
Value of Standard Deviation in
Samples No. 1 to No. 10 of $(La_{0.6}Sr_{0.4})(Co_{0.2}Fe_{0.8})O_3$

| Sample No. | Maximum Value Standard Deviation at A site | Maximum Value Standard Deviation at B site | Deterioration Rate (%/1000 hr) | Evaluation Result |
|---|---|---|---|---|
| 1 | 6.23 | 3.99 | 0.76 | Good |
| 2 | 4.11 | 1.54 | 0.63 | Good |
| 3 | 10.3 | 3.61 | 0.95 | Good |
| 4 | 1.56 | 0.68 | 0.65 | Good |
| 5 | 13.2 | 4.98 | 1.85 | Poor |
| 6 | 11.5 | 4.88 | 1.52 | Poor |
| 7 | 0.05 | 0.10 | 0.30 | Good |
| 8 | 0.46 | 0.07 | 0.52 | Good |
| 9 | 1.13 | 0.68 | 0.87 | Good |
| 10 | 0.25 | 0.05 | 0.45 | Good |

As illustrated in FIG. 4 to FIG. 5 and Table 1 to Table 3, the deterioration rate was suppressed to a small value for samples No. 1 to No. 4, and No. 7 to No. 10. These samples exhibit a standard deviation (scattering) for the atomic percentage of elements at the A site of less than 11.5, more specifically, the value was no more than 10.3. The standard deviation for the atomic percentage of elements at the B site was no more than 3.99.

In samples No. 5 and No. 6 which exhibited a large deterioration rate, the standard deviation for the atomic percentage of elements at the A site was at least 11.5, and the standard deviation for the atomic percentage of elements at the B site was at least 4.88.

C-2 No. 11 to No. 16: $(La_{0.8}Sr_{0.2})FeO_3$

In relation to the samples No. 11 to No. 16, the measurement results using the concentration of No. 11 sample as an example, and the results of the calculation of the average value and the standard deviation are shown in Table 4. Table 5 shows the maximum value of the standard deviation for the atomic percentage of each element in relation to samples No. 11 to No. 16. The maximum value of the standard deviation at the A site and the maximum value of the standard deviation at the B site are underlined in relation to each sample. Table 6 shows the maximum value of the standard deviation at the A site and the maximum value of the standard deviation at the B site shown in Table 5, the voltage drop rate (deterioration rate) per 1000 hours, and the evaluation results based on the voltage drop rate for samples No. 11 to No. 16.

TABLE 4

Concentration Analysis Results for 10 Spots in
Sample No. 11 of $(La_{0.8}Sr_{0.2})FeO_3$

| Analysis Spot | La (mol %) | Sr (mol %) | Fe (mol %) |
|---|---|---|---|
| 1 | 36.4 | 8.8 | 54.8 |
| 2 | 35.9 | 9.1 | 55.0 |
| 3 | 30.5 | 11.4 | 58.1 |
| 4 | 36.1 | 8.8 | 55.1 |
| 5 | 41.8 | 6.5 | 51.7 |
| 6 | 36.9 | 8.5 | 54.6 |
| 7 | 49.7 | 6.1 | 44.2 |
| 8 | 28.2 | 11.1 | 60.7 |
| 9 | 36.8 | 8.7 | 54.5 |
| 10 | 42.0 | 6.6 | 51.4 |
| Average Value | 37.43 | 8.56 | 54.01 |
| Standard Deviation | 5.74 | 1.71 | 4.16 |

TABLE 5

Maximum Value for Standard Deviation and Additive Content Amount for Samples No. 11 to No. 16 of $(La_{0.8}Sr_{0.2})FeO_3$

| Sample No. | Synthesis Method | Standard Deviation | | | Additive content amount (ppm) | | |
|---|---|---|---|---|---|---|---|
| | | A site | B site | | | | |
| | | La | Sr | Fe | P | Cr | B |
| 11 | Solid phase method | <u>5.74</u> | 1.71 | <u>4.16</u> | 20 | 100 | 10 |
| 12 | Solid phase method | <u>4.28</u> | 2.95 | <u>3.25</u> | 30 | 300 | 20 |
| 13 | Solid phase method | <u>7.91</u> | 2.77 | <u>3.68</u> | 50 | 500 | 50 |
| 14 | Solid phase method | <u>10.95</u> | 2.65 | <u>4.98</u> | 60 | 550 | 70 |
| 15 | Liquid phase method | 1.04 | <u>1.73</u> | <u>0.65</u> | 20 | 80 | 10 |
| 16 | Liquid phase method | <u>0.43</u> | 0.09 | <u>0.21</u> | 10 | 30 | 5 |

TABLE 6

Evaluation Result for Deterioration Rate and Maximum Value of Standard Deviation in Samples No. 11 to No. 16 of $(La_{0.8}Sr_{0.2})FeO_3$

| Sample No. | Maximum Value Standard Deviation at A site | Maximum Value Standard Deviation at B site | Deterioration Rate (%/1000 hr) | Evaluation Result |
|---|---|---|---|---|
| 11 | 5.74 | 4.16 | 0.34 | Good |
| 12 | 4.28 | 3.25 | 0.42 | Good |
| 13 | 7.91 | 3.68 | 0.55 | Good |
| 14 | 10.95 | 4.98 | 1.23 | Poor |
| 15 | 1.73 | 0.65 | 0.32 | Good |
| 16 | 0.43 | 0.21 | 0.22 | Good |

As illustrated in Table 4 to Table 6, the deterioration rate was suppressed to a small value for samples No. 11 to No. 13, No. 15 and No. 16. These samples exhibit a standard deviation (scattering) for the atomic percentage of elements at the A site of no more than 7.91, and the standard deviation for the atomic percentage of elements at the B site was no more than 4.16.

In sample No. 14 which exhibited a large deterioration rate, the standard deviation for the atomic percentage of elements at the A site was at least 10.95. In sample No. 14, the standard deviation for the atomic percentage of elements at the B site was comparatively large at 4.98.

C-3 No. 17 to No. 22: $La(Ni_{0.6}Fe_{0.4})O_3$

In relation to the samples No. 17 to No. 22, the measurement results using the concentration of No. 17 sample as an example, and the results of the calculation of the average value and the standard deviation are shown in Table 7. Table 8 shows the maximum value of the standard deviation for the atomic percentage of each element in relation to samples No. 17 to No. 22. The maximum value of the standard deviation at the A site and the maximum value of the standard deviation at the B site are underlined in relation to each sample. Table 9 shows the maximum value of the standard deviation at the A site and the maximum value of the standard deviation at the B site shown in Table 8, the voltage drop rate (deterioration rate) per 1000 hours, and the evaluation results based on the voltage drop rate for samples No. 17 to No. 22.

TABLE 7

Concentration Analysis Results for 10 Spots in Sample No. 17 of $La(Ni_{0.6}Fe_{0.4})O_3$

| Analysis Point | La (mol %) | Ni (mol %) | Fe (mol %) |
|---|---|---|---|
| 1 | 40.3 | 28.7 | 31.0 |
| 2 | 37.4 | 33.9 | 28.7 |
| 3 | 48.7 | 31.5 | 19.8 |
| 4 | 58.1 | 25.4 | 16.5 |
| 5 | 41.8 | 32.0 | 26.2 |
| 6 | 40.9 | 34.8 | 24.3 |
| 7 | 42.1 | 29.9 | 28.0 |
| 8 | 59.2 | 23.9 | 16.9 |
| 9 | 35.7 | 36.4 | 27.9 |
| 10 | 47.9 | 28.9 | 23.2 |
| Average Value | 45.21 | 30.54 | 24.25 |
| Standard Deviation | 7.72 | 3.79 | 4.81 |

TABLE 8

Maximum Value for Standard Deviation and Additive Content Amount for Samples No. 17 to No. 22 of $La(Ni_{0.6}Fe_{0.4})O_3$

| Sample No. | Synthesis Method | Standard Deviation | | | Additive content amount (ppm) | | |
|---|---|---|---|---|---|---|---|
| | | A site | B site | | | | |
| | | La | Ni | Fe | P | Cr | B |
| 17 | Solid phase method | <u>7.72</u> | 3.79 | <u>4.81</u> | 40 | 400 | 50 |

TABLE 8-continued

Maximum Value for Standard Deviation and Additive Content Amount for Samples No. 17 to No. 22 of La(Ni$_{0.6}$Fe$_{0.4}$)O$_3$

| | | Standard Deviation | | | Additive content amount (ppm) | | |
|---|---|---|---|---|---|---|---|
| | Synthesis | A site | B site | | | | |
| Sample No. | Method | La | Ni | Fe | P | Cr | B |
| 18 | Solid phase method | 10.5 | 6.35 | 1.23 | 60 | 600 | 60 |
| 19 | Solid phase method | 5.23 | 4.35 | 2.35 | 50 | 500 | 30 |
| 20 | Solid phase method | 3.52 | 4.23 | 1.85 | 30 | 250 | 20 |
| 21 | Liquid phase method | 1.35 | 1.23 | 0.85 | 20 | 100 | 10 |
| 22 | Liquid phase method | 0.35 | 0.33 | 0.36 | 10 | 50 | 5 |

TABLE 9

Evaluation Result for Deterioration Rate and Maximum Value of Standard Deviation in Samples No. 17 to No. 22 of La(Ni$_{0.6}$Fe$_{0.4}$)O$_3$

| Sample No. | Maximum Value Standard Deviation at A site | Maximum Value Standard Deviation at B site | Deterioration Rate (%/1000 hr) | Evaluation Result |
|---|---|---|---|---|
| 17 | 7.72 | 4.81 | 0.78 | Good |
| 18 | 10.5 | 6.35 | 1.65 | Poor |
| 19 | 5.23 | 4.35 | 0.75 | Good |
| 20 | 3.52 | 4.23 | 0.68 | Good |
| 21 | 1.35 | 1.23 | 0.46 | Good |
| 22 | 0.35 | 0.36 | 0.45 | Good |

As illustrated in Table 7 to Table 9, the deterioration rate was suppressed to a small value for samples No. 17, No. 19 to No. 22. These samples exhibit a standard deviation (scattering) for the atomic percentage of elements at the A site of no more than 7.72. These samples exhibit the standard deviation for the atomic percentage of elements at the B site was no more than 4.81.

On the other hand, the standard deviation for the atomic percentage of elements at the A site in sample No. 18 which exhibited a large deterioration rate was relatively large at 10.5, and the standard deviation for the atomic percentage of elements at the B site was also comparatively large at 6.35.

C-4 No. 23 to No. 28: (La$_{0.6}$Sr$_{0.4}$)(Co$_{0.2}$Fe$_{0.8}$)O$_3$

Table 10 shows the measurement results for the voltage drop rate (deterioration rate) per 1000 hours and the concentration of the additive (P, Cr and B) for Samples No. 23 to No. 28.

TABLE 10

| Sample No. | Synthesis Method | Additive content amount (ppm) | | | Deterioration Rate (%/1000 hr) | Evaluation Result |
|---|---|---|---|---|---|---|
| | | P | Cr | B | | |
| 23 | Solid phase method | 60 | 530 | 75 | 1.66 | Poor (x) |
| 24 | Liquid phase method | 50 | 500 | 50 | 0.65 | Good (○) |
| 25 | Solid phase method | 40 | 250 | 25 | 0.56 | Good (○) |
| 26 | Liquid phase method | 30 | 100 | 10 | 0.38 | Good (◉) |
| 27 | Liquid phase method | 15 | 65 | 5 | 0.23 | Good (◉) |
| 28 | Liquid phase method | less than 1 | less than 1 | less than 1 | 1.23 | Poor (x) |

As illustrated in Table 10, the deterioration rate was not suppressed to a small value in sample No. 28. Therefore, it is determined that addition of at least 1 ppm of all of P, Cr and B to the electrode material is preferred. The deterioration rate was not suppressed to a small value in relation to sample No. 23. Therefore it was confirmed that the preferred content amount in the electrode material of P is no more than 50 ppm, the preferred content amount in the electrode material of Cr is no more than 500 ppm, and the preferred content amount in the electrode material of B is no more than 50 ppm. A comparison of No. 24, 25 and No. 26, 27 enables confirmation that the preferred content amount in the electrode material of P is no more than 30 ppm, the preferred content amount in the electrode material of Cr is no more than 100 ppm, and the preferred content amount in the electrode material of B is no more than 10 ppm.

C-5 Summary

From the above results, the deterioration of the cathode can be suppressed by a relatively uniform configuration in the distribution of atoms (small standard deviation).

It was confirmed that the content amount of additives (P, Cr and B) contained in the electrode material results in a small standard deviation when 1 ppm≤P≤50 ppm, 1 ppm≤Cr≤500 ppm and 1 ppm≤B≤50 ppm.

From the point of view of a stable microstructure in a porous electrode, the content amount of additives (P, Cr and B) contained in the electrode material has been confirmed to be 1 ppm≤P≤30 ppm, 1 ppm≤Cr≤100 ppm and 1 ppm≤B≤10 ppm. These results demonstrate an effect of strengthening of the backbone of a porous electrode by addition of a microscopic amount of the additives.

Wet assay (ICP analysis) was used to confirm that the macro composition of each sample coincides with the well-formed composition of the raw materials.

The relationship between the atomic distribution and the deterioration of the cathode is purported to be as follows.

Even when the overall composition of the powdered cathode material coincides with the well-formed composition, if the location (distribution) of respective elements is not uniform when the micro-portions are observed, the composition of those portions deviates from the overall composition. Catalytic activity and conductivity is low in such portions, and thereby a cathodic function during power generation operations is low. When operating as a fuel cell, current flow tends to avoid such inactive portions, and thereby the current density is increased in the periphery of such portions. As the result, the deterioration of such peripheral portions is accelerated.

Although the scattering of the atomic percentage was calculated in each table by use of a disintegrated product, since the spot diameter during analysis for a powdered material is smaller than the diameter of a disintegrated product, it was confirmed for all materials that there is no difference in relation to the atomic distribution configuration (scattering) from a disintegrated product.

What is claimed is:

1. A cathode material for a solid oxide fuel cell, comprising:
a complex oxide having a perovskite structure expressed by the general formula $ABO_3$, where A is at least one of lanthanum and strontium, and where B is at least one of cobalt, iron and nickel, a content amount of phosphorus included in the complex oxide being at least 10 ppm and no more than 50 ppm, a content amount of chromium in the complex oxide being at least 50 ppm and no more than 500 ppm, and a content amount of boron in the complex oxide being at least 5 ppm and no more than 50 ppm in a weight ratio relative to a total weight of the complex oxide, the cathode material having a uniform composition distribution throughout the cathode material including an outer surface and an inner body of the cathode material.

2. The cathode material for a solid oxide fuel cell according to claim 1, wherein
the content amount of phosphorus included in the complex oxide is no more than 30 ppm in the weight ratio relative to the total weight of the complex oxide.

3. The cathode material for a solid oxide fuel cell according to claim 1, wherein
the content amount of chromium included in the complex oxide is no more than 100 ppm in the weight ratio relative to the total weight of the complex oxide.

4. The cathode material for a solid oxide fuel cell according to claim 1, wherein
the content amount of boron included in the complex oxide is more preferably no more than 10 ppm in the weight ratio relative to the total weight of the complex oxide.

5. The cathode material for a solid oxide fuel cell according to claim 2, wherein
the content amount of chromium included in the complex oxide is no more than 100 ppm in the weight ratio relative to the total weight of the complex oxide.

6. The cathode material for a solid oxide fuel cell according to claim 2, wherein
the content amount of boron included in the complex oxide is more preferably no more than 10 ppm in the weight ratio relative to the total weight of the complex oxide.

7. The cathode material for a solid oxide fuel cell according to claim 3, wherein
the content amount of boron included in the complex oxide is more preferably no more than 10 ppm in the weight ratio relative to the total weight of the complex oxide.

8. A solid oxide fuel cell comprising the cathode made of the cathode material according to claim 1, the solid oxide fuel cell further comprising:
an anode; and
a solid electrolyte layer disposed between the cathode and the anode.

9. A solid oxide fuel cell comprising the cathode made of the cathode material according to claim 2, the solid oxide fuel cell further comprising:
an anode; and
a solid electrolyte layer disposed between the cathode and the anode.

10. A solid oxide fuel cell comprising the cathode made of the cathode material according to claim 3, the solid oxide fuel cell further comprising:
an anode; and
a solid electrolyte layer disposed between the cathode and the anode.

11. A solid oxide fuel cell comprising the cathode made of the cathode material according to claim 4, the solid oxide fuel cell further comprising:
an anode; and
a solid electrolyte layer disposed between the cathode and the anode.

12. A cathode material for a solid oxide fuel cell, comprising:
a complex oxide having a perovskite structure expressed by the general formula $ABO_3$, where A is at least one of lanthanum and strontium, and where B is at least one of cobalt, iron and nickel, a content amount of phosphorus included in the complex oxide being at least 10 ppm and no more than 50 ppm, a content amount of chromium in the complex oxide being at least 20 ppm and no more than 500 ppm, and a content amount of boron in the complex oxide being at least 3 ppm and no more than 50 ppm in a weight ratio relative to a total weight of the complex oxide, the cathode material having a uniform composition distribution throughout the cathode material including an outer surface and an inner body of the cathode material.

13. The cathode material for a solid oxide fuel cell according to claim 12, wherein
the content amount of phosphorus included in the complex oxide is no more than 30 ppm in the weight ratio relative to the total weight of the complex oxide.

14. The cathode material for a solid oxide fuel cell according to claim 12, wherein
the content amount of chromium included in the complex oxide is no more than 100 ppm in the weight ratio relative to the total weight of the complex oxide.

15. The cathode material for a solid oxide fuel cell according to claim 12, wherein
the content amount of boron included in the complex oxide is more preferably no more than 10 ppm in the weight ratio relative to the total weight of the complex oxide.

16. A solid oxide fuel cell comprising the cathode made of the cathode material according to claim 12, the solid oxide fuel cell further comprising:
an anode; and
a solid electrolyte layer disposed between the cathode and the anode.

* * * * *